UNITED STATES PATENT OFFICE.

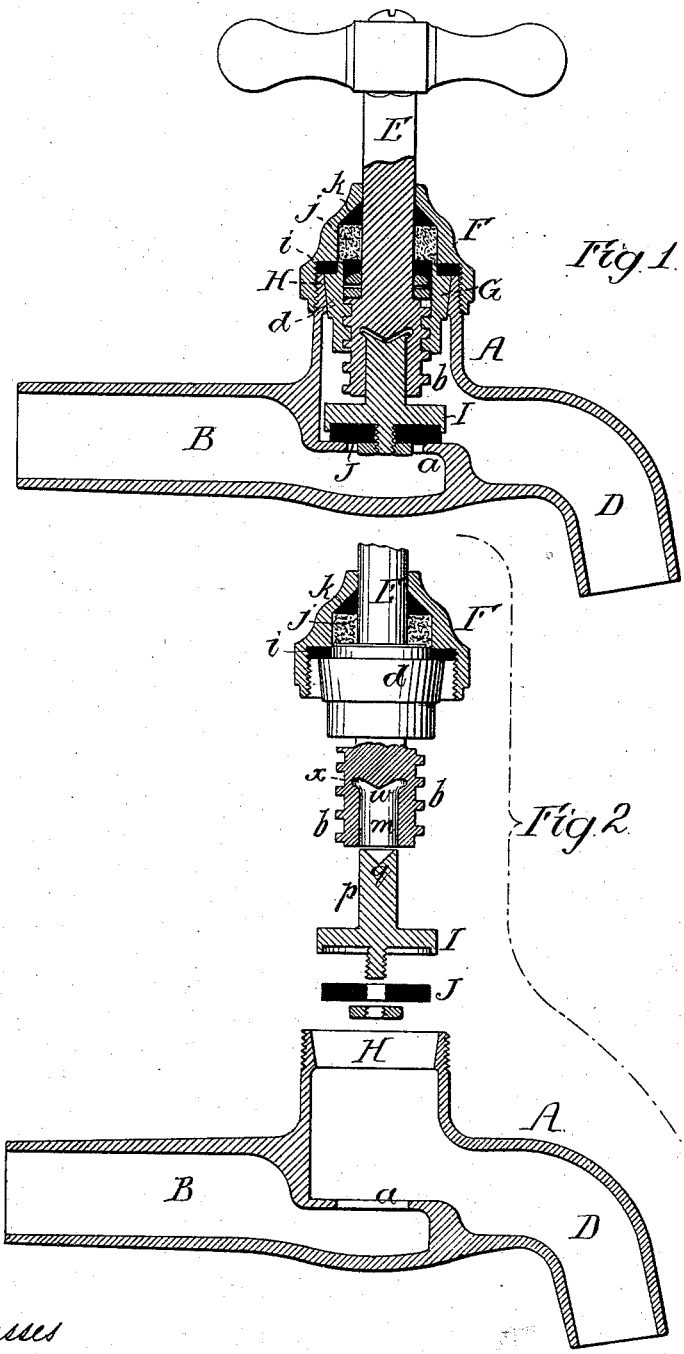

WILLIAM S. COOPER, OF PHILADELPHIA, PENNSYLVANIA.

IMPROVEMENT IN FAUCETS.

Specification forming part of Letters Patent No. 218,936, dated August 26, 1879; application filed February 4, 1879.

*To all whom it may concern:*

Be it known that I, WILLIAM S. COOPER, of Philadelphia, Pennsylvania, have invented a new and useful Improvement in Faucets, of which the following is a specification.

My invention relates to that class of faucets in which a screw-spindle, carrying a valve, is adapted to a fixed nut in the valve-chest; and the objects of my invention are, first, to secure the said nut in its place in a simple and effective manner; and, second, to loosely connect the valve to the valve-spindle by combining a countersunk stem on the valve with an orifice formed in the spindle, and having an enlargement at the end, all as fully described hereinafter.

In the accompanying drawings, Figure 1 is a sectional view of a faucet with my improvements; and Fig. 2, views of the several parts (mainly in section) detached from each other.

A is the valve-chest of the faucet; B, the inlet, and D the outlet, branch; and $a$, the valve seat, these parts being constructed and arranged in the same manner as in ordinary faucets of the class to which my invention relates.

E is the valve-spindle, passing through the cap F, which, as usual, is secured to the top of the chest.

The lower portion of the spindle is enlarged, and has a screw-thread, $b$, adapted to an internal screw in the fixed nut G, which is fitted to the chest.

Lugs and other contrivances have been hitherto used for preventing this nut from turning in the chest; but I have found that by making the portion $d$ of the nut and its bearing in the chest with a slight taper the said nut will be so tightly wedged to its bearing by the screw-cap F, through the medium of the packing, that it cannot turn with the valve-spindle.

This mode of fitting the nut to the valve-chest is an important feature of my invention, as it is an economical plan and insures a tight joint.

There is packing at $i$, $j$, and $k$, and a spring, H, as in other faucets of this class.

The mode of attaching the valve to the spindle is the second prominent feature of my invention.

The valve proper consists of the metal disk I and a leather washer, J, secured to the said disk; and on the latter, and forming part of the same, is a stem, $p$, arranged to fit snugly, but turn freely, in an orifice, $m$, in the lower portion of the spindle. This orifice is enlarged by undercutting at its upper end, where there is, preferably, a central pointed or rounded projection, $w$, the enlargement forming an annular recess, $x$.

The stem $p$ of the valve has at the end a countersink, $q$, so that when the said stem is driven into the orifice $m$, or the spindle is screwed down tight on the said stem, the end of the latter will be forced outward and will become a flange, which enters the annular recess $x$, and the valve will be thus connected to the spindle without the aid of the usual fastenings, and in such a manner that the spindle can be turned independently of the valve.

I claim as my invention—

1. The combination, in a faucet, of the spindle E, having a threaded portion, $b$, the nut G, having a tapering portion, $d$, the valve-chest having a tapering bearing for the said nut, and the retaining-cap F, all substantially as set forth.

2. The screw-spindle having an orifice, at the end of which is an enlargement, $x$, in combination with a valve having a countersunk stem, $p$, substantially as specified.

In testimony whereof I have signed my name to this specification in the presence of two subscribing witnesses.

WM. S. COOPER.

Witnesses:
WM. J. COOPER,
HARRY SMITH.